United States Patent
Kesse et al.

(10) Patent No.: US 9,518,492 B2
(45) Date of Patent: Dec. 13, 2016

(54) EXHAUST SYSTEM IMPLEMENTING IN SITU CALIBRATION

(75) Inventors: Mary Lou Kesse, Hanna City, IL (US); Zhiyong Wei, Chicago, IL (US); Liangtao Zhu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 2583 days.

(21) Appl. No.: 12/081,894

(22) Filed: Apr. 23, 2008

(65) Prior Publication Data

US 2009/0266059 A1    Oct. 29, 2009

(51) Int. Cl.
  *F01N 3/00* (2006.01)
  *F01N 3/10* (2006.01)
  *F01N 3/20* (2006.01)

(52) U.S. Cl.
  CPC ......... *F01N 3/208* (2013.01); *F01N 2560/026* (2013.01); *F01N 2610/02* (2013.01); *F01N 2900/0408* (2013.01); *F01N 2900/0411* (2013.01); *F01N 2900/0412* (2013.01); *Y02T 10/24* (2013.01)

(58) Field of Classification Search
  USPC .......... 60/274, 276, 277, 286, 295, 301, 303
  See application file for complete search history.

(56) References Cited

U.S. PATENT DOCUMENTS

| | | |
|---|---|---|
| 5,047,220 A | 9/1991 | Polcer |
| 5,369,956 A | 12/1994 | Daudel et al. |
| 6,125,629 A | 10/2000 | Patchett |
| 6,305,160 B1 * | 10/2001 | Hammerle et al. ............. 60/274 |
| 6,361,754 B1 | 3/2002 | Peter-Hoblyn et al. |
| 6,427,439 B1 * | 8/2002 | Xu et al. .......................... 60/286 |
| 6,455,009 B1 | 9/2002 | Kato et al. |
| 6,698,191 B2 * | 3/2004 | Xu et al. .......................... 60/286 |
| 6,898,929 B2 | 5/2005 | Asmus et al. |
| 6,928,806 B2 | 8/2005 | Tennison et al. |
| 6,993,900 B2 | 2/2006 | Upadhyay et al. |
| 6,996,975 B2 | 2/2006 | Radhamohan et al. |
| 7,055,313 B2 | 6/2006 | Russell |

(Continued)

*Primary Examiner* — Thomas Denion
*Assistant Examiner* — Diem Tran
(74) *Attorney, Agent, or Firm* — Finnegan, Henderson, Farabow, Garrett & Dunner, LLP

(57) ABSTRACT

An exhaust system for use with a combustion engine is disclosed. The exhaust system may have an exhaust passageway, a reduction catalyst, a reductant injector, and a controller. The controller may have a $NO_x$/reductant relationship map, and be configured to receive a first input relating to an amount of $NO_x$ within the exhaust passageway upstream of the reduction catalyst, and reference the $NO_x$/reductant relationship map to determine an initial amount of reductant that should be directed into the exhaust passageway based on the first input. The controller may also be configured to receive a second input relating to performance of the reduction catalyst, determine an adjustment to the initial amount of reductant based on the second input, and regulate operation of the reductant injector to direct an adjusted amount of reductant into the exhaust passageway. The controller may further be configured to update the $NO_x$/reductant relationship map based on the determined adjustment.

18 Claims, 2 Drawing Sheets

(56) References Cited

U.S. PATENT DOCUMENTS

| | | |
|---|---|---|
| 7,062,905 B2 | 6/2006 | Khair et al. |
| 7,121,085 B2 * | 10/2006 | van Nieuwstadt .............. 60/286 |
| 7,134,273 B2 | 11/2006 | Mazur et al. |
| 7,168,243 B2 | 1/2007 | Endicott et al. |
| 7,603,846 B2 * | 10/2009 | Lueders et al. ................ 60/277 |
| 7,610,750 B2 * | 11/2009 | Viola et al. .................... 60/286 |
| 2005/0252201 A1 | 11/2005 | Lecea et al. |
| 2006/0248876 A1 | 11/2006 | Taxon |
| 2008/0066456 A1 * | 3/2008 | Schmieg et al. ............... 60/286 |

* cited by examiner

EXHAUST SYSTEM IMPLEMENTING IN SITU CALIBRATION

TECHNICAL FIELD

The present disclosure is directed to an exhaust system and, more particularly, to an exhaust system that implements in situ calibration.

BACKGROUND

Internal combustion engines, including diesel engines, gasoline engines, gaseous fuel-powered engines, and other engines known in the art exhaust a complex mixture of air pollutants. These air pollutants are composed of gaseous compounds such as, for example, the oxides of nitrogen ($NO_x$). Due to increased awareness of the environment, exhaust emission standards have become more stringent, and the amount of $NO_x$ emitted from an engine may be regulated depending on the type of engine, size of engine, and/or class of engine. In order to ensure compliance with the regulation of these compounds, some engine manufacturers have implemented a strategy called Selective Catalytic Reduction (SCR).

SCR is a process where gaseous or liquid reductant (most commonly a urea/water solution) is added to the exhaust gas stream of an engine and is absorbed onto a catalyst. The reductant reacts with $NO_x$ in the exhaust gas to form $H_2O$ and $N_2$, which can be safely released to the atmosphere. Although SCR can be an effective method for reducing $NO_x$, it can also be difficult to ensure that enough reductant has been injected to adequately reduce the amount of $NO_x$ present within the exhaust gas stream, without unnecessarily wasting reductant and releasing unused reductant or byproducts thereof to the atmosphere.

One attempt to regulate the injection of reductant is described in U.S. Pat. No. 6,361,754 (the '754 patent) issued to Peter-Hoblyn et al. on Mar. 26, 2002. The '754 patent discloses an exhaust system for reducing $NO_x$ emissions from an internal combustion engine. The exhaust system includes an exhaust pipe of an engine, and an SCR catalyst located within the exhaust pipe. The exhaust system also includes a tank of urea, a pump that pressurizes the urea, a valve that meters the pressurized urea, and a nozzle that injects the metered and pressurized urea into the exhaust pipe upstream of the SCR catalyst.

The injection of urea into the exhaust by the system of the '754 patent is regulated by a feedforward controller in response to a number of measured parameters, including: fuel flow, throttle setting, engine speed, rack setting, intake air temperature, barometric pressure, intake air humidity, and exhaust gas temperature. That is, the injection of urea based on target $NO_x$ concentrations can be preprogrammed into the feedforward controller based on tested values for given fuel flows and related parameters. In addition, to the extent the sensors are available, trim or feedback control is provided based on residual levels of gas species following the SCR catalyst, e.g., the level of $NO_x$, HC, or CO. If desired, feedback control can also be employed to trim the system in response to residual levels of ammonia. In this manner, the sensors correct the preprogrammed values by feedback control.

Although perhaps somewhat effective at controlling reductant injections, the exhaust system of the '754 patent may fail to appropriately account for manufacturing variability and aging. That is, because the system relies on preprogrammed values, the accuracy of different systems preprogrammed with the same values may be low due to manufacturing variability. And, even if the system of the '754 patent provided preprogrammed values tailored to specific systems, the cost of doing the calibration testing on each system would be excessive. Further, even if extensive calibration is performed for each system, the feedforward control of the '754 patent may lose accuracy as the system ages. Without accounting for aging (both thermal and chemical aging), it may be difficult to diagnose system malfunction.

The system of the present disclosure solves one or more of the problems set forth above and/or other problems.

SUMMARY

One aspect of the present disclosure is directed to an exhaust system for use with a combustion engine. The exhaust system may include an exhaust passageway, a reduction catalyst disposed within the exhaust passageway, and a reductant injector located to direct reductant into the exhaust passageway upstream of the reduction catalyst. The exhaust system may also include a controller in communication with the reductant injector. The controller may have a $NO_x$/reductant relationship map stored in memory thereof, and be configured to receive a first input relating to an amount of $NO_x$ within the exhaust passageway upstream of the reduction catalyst. The controller may also be configured to reference the $NO_x$/reductant relationship map to determine an initial amount of reductant that should be directed into the exhaust passageway based on the first input. In addition, the controller may be configured to receive a second input relating to performance of the reduction catalyst, and to determine an adjustment to the initial amount of reductant based on the second input. The controller may be further configured to regulate operation of the reductant injector to direct an adjusted amount of reductant into the exhaust passageway, and to update the $NO_x$/reductant relationship map based on the determined adjustment.

Another aspect of the present disclosure is directed to a method of operating a combustion engine. The method may include directing a flow of exhaust from the combustion engine through a reduction catalyst, and determining an amount of $NO_x$ upstream of the reduction catalyst. The method may also include referencing a $NO_x$/reductant relationship map to determine an initial amount of reductant that should directed into the flow of exhaust based on the determined amount of $NO_x$. In addition, the method may include determining a performance of the reduction catalyst, and determining an adjusted amount of reductant based on the determined performance. The method may further include directing the adjusted amount of reductant into the exhaust flow upstream of the reduction catalyst, and updating the $NO_x$/reductant relationship map based on the determined adjustment.

DETAILED DESCRIPTION

Figure 1:
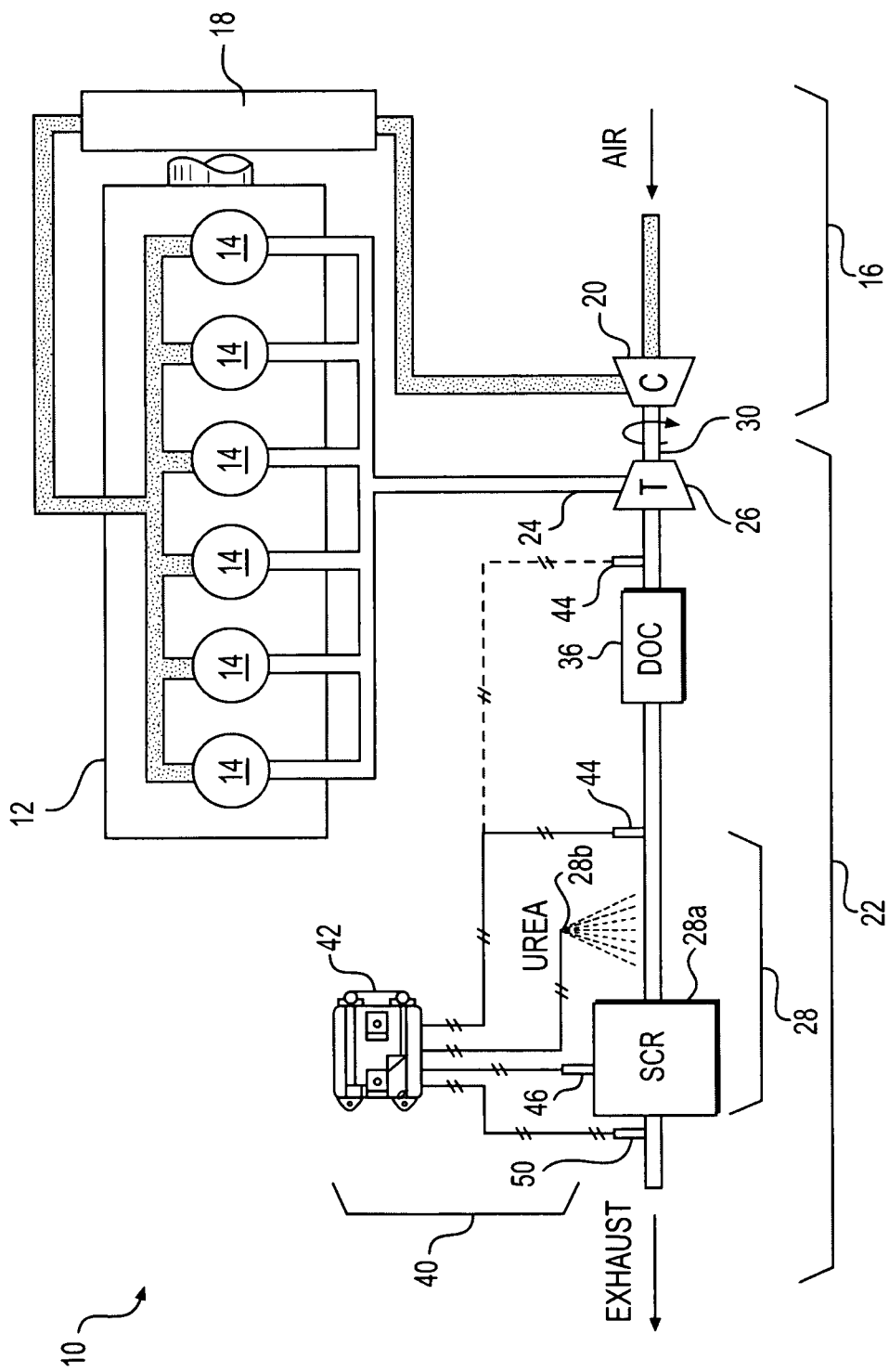
FIG. 1 is a schematic and diagrammatic illustration of an exemplary disclosed power system.

FIG. 1 illustrates an exemplary power system 10. For the purposes of this disclosure, power system 10 is depicted and described as a diesel-fueled, internal combustion engine.

However, it is contemplated that power system 10 may embody any other type of combustion engine, such as, for example, a gasoline or a gaseous fuel-powered engine. Power system 10 may include an engine block 12 at least partially defining a plurality of cylinders 14, and a plurality of piston assemblies (not shown) disposed within cylinders 14. It is contemplated that power system 10 may include any number of cylinders 14 and that cylinders 14 may be disposed in an "in-line" configuration, a "V" configuration, or in any other conventional configuration.

Multiple separate sub-system may be included within power system 10. For example, power system 10 may include an air induction system 16, an exhaust system 22, and a control system 40. Air induction system 16 may be configured to direct air or an air and fuel mixture into power system 10 for subsequent combustion. Exhaust system 22 may exhaust byproducts of the combustion to the atmosphere. Control system 40 may regulate the operation of air induction and exhaust systems 16, 22 to reduce the discharge of regulated constituents to the atmosphere.

Air induction system 16 may include multiple components that cooperate to condition and introduce compressed air into cylinders 14. For example, air induction system 16 may include an air cooler 18 located downstream of one or more compressors 20. Compressors 20 may be connected to pressurize inlet air directed through cooler 18. It is contemplated that air induction system 16 may include different or additional components than described above such as, for example, a throttle valve, variable valve actuators associated with each cylinder 14, filtering components, compressor bypass components, and other known components, if desired. It is further contemplated that compressor 20 and/or cooler 18 may be omitted, if a naturally aspirated engine is desired.

Exhaust system 22 may include multiple components that condition and direct exhaust from cylinders 14 to the atmosphere. For example, exhaust system 22 may include an exhaust passageway 24, one or more turbines 26 driven by the exhaust flowing through passageway 24, and a reduction catalyst 28 fluidly connected downstream of turbine 26. It is contemplated that exhaust system 22 may include different or additional components than described above such as, for example, bypass components, an exhaust compression or restriction brake, an attenuation device, additional exhaust treatment devices, and other known components, if desired.

Turbine 26 may be located to receive exhaust leaving power system 10, and may be connected to one or more compressors 20 of air induction system 16 by way of a common shaft 30 to form a turbocharger. As the hot exhaust gases exiting power system 10 move through turbine 26 and expand against vanes (not shown) thereof, turbine 26 may rotate and drive the connected compressor 20 to pressurize inlet air.

Reduction catalyst 28 may receive exhaust from turbine 26 and reduce constituents of the exhaust to innocuous gases. In one example, reduction catalyst 28 may embody a Selective Catalytic Reduction (SCR) device having a catalyst substrate 28a located downstream from a reductant injector 28b. A gaseous or liquid reductant, most commonly urea $(NH_2)2CO$, a water/urea mixture, a hydrocarbon for example diesel fuel, or ammonia gas $(NH_3)$, may be sprayed or otherwise advanced into the exhaust upstream of catalyst substrate 28a by reductant injector 28b. As the reductant is absorbed onto the surface of catalyst substrate 28a, the reductant may react with $NO_X$ (NO and $NO_2$) in the exhaust gas to form water $(H_2O)$ and elemental nitrogen $(N_2)$. The reduction process performed by catalyst 28 may be most effective when a concentration of NO to $NO_2$ supplied to reduction catalyst 28 is about 1:1.

To help provide the correct concentration of NO to $NO_2$, an oxidation catalyst 36 may be located upstream of reduction catalyst 28, in some embodiments. Oxidation catalyst 36 may be, for example, a diesel oxidation catalyst (DOC). As a DOC, oxidation catalyst 36 may include a porous ceramic honeycomb structure or a metal mesh substrate coated with a material, for example a precious metal, that catalyzes a chemical reaction to alter the composition of the exhaust. For example, oxidation catalyst 36 may include palladium, platinum, vanadium, or a mixture thereof that facilitates the conversion of NO to $NO_2$. It is contemplated that, instead of a stand-alone oxidation catalyst, it is contemplated that exhaust system 22 may alternatively include a catalyzed particulate filter (CDPF), if desired.

Control system 40 may include components configured to regulate the treatment of exhaust prior to discharge to the atmosphere. Specifically, control system 40 may include a controller 42 in communication with a plurality of sensors. Based on input from each of the sensors, controller 42 may determine an amount of $NO_X$ being produced by power system 10 (or, alternatively, an amount of $NO_X$ present at any location upstream of, entering, or within reduction catalyst 28), an operational parameter of reduction catalyst 28, an amount of reductant that should be sprayed by reductant injector 28b into the exhaust flow based on the $NO_X$ production amount and the operational parameter, a performance parameter of reduction catalyst 28, and an adjustment of the reductant injection based on the performance parameter. Controller 42 may then regulate operation of reductant injector 28b such that the adjusted amount of reductant is directed into the exhaust flow upstream of catalyst substrate 28a.

Controller 42 may embody a single or multiple microprocessors, field programmable gate arrays (FPGAs), digital signal processors (DSPs), etc. that include a means for controlling an operation of power system 10 in response to signals received from the various sensors. Numerous commercially available microprocessors can be configured to perform the functions of controller 42. It should be appreciated that controller 42 could readily embody a microprocessor separate from that controlling other non-exhaust related power system functions, or that controller 42 could be integral with a general power system microprocessor and be capable of controlling numerous power system functions and modes of operation. If separate from the general power system microprocessor, controller 42 may communicate with the general power system microprocessor via datalinks or other methods. Various other known circuits may be associated with controller 42, including power supply circuitry, signal-conditioning circuitry, actuator driver circuitry (i.e., circuitry powering solenoids, motors, or piezo actuators), communication circuitry, and other appropriate circuitry.

A first sensor 44 of control system 40 may embody a constituent sensor configured to generate a signal indicative of the presence of a particular constituent within the exhaust flow. For instance, sensor 44 may be a $NO_X$ sensor configured to determine an amount (i.e., quantity, relative percent, ratio, etc.) of NO and/or $NO_2$ present within the exhaust of power system 10. If embodied as a physical sensor, sensor 44 may be located upstream or downstream of oxidation catalyst 36. When located upstream of oxidation catalyst 36 (shown by phantom lines in FIG. 1), sensor 44 may be situated to sense a production of $NO_X$ by power system 10. When located downstream of oxidation catalyst 36 (shown by solid lines in FIG. 1), sensor 44 may be situated to sense an amount of $NO_X$ exiting oxidation catalyst 36 and/or a conversion effectiveness of oxidation catalyst 36. Sensor 44 may generate a signal indicative of these measurements and send it to controller 42. It is contemplated that two or more sensors 44 may be included within control system 40, if desired, and located both upstream and downstream of oxidation catalyst 36.

It is further contemplated that sensor 44 may alternatively embody a virtual sensor. A virtual sensor may produce a model-driven estimate based on one or more known or sensed operational parameters of power system 10 and/or oxidation catalyst 36. For example, based on a known operating speed, load, temperature, boost pressure, ambient conditions (humidity, pressure, temperature), and/or other parameter of power system 10, a model may be referenced to determine an amount of NO and/or $NO_2$ produced by power system 10. Similarly, based on a known or estimated $NO_X$ production of power system 10, a flow rate of exhaust exiting power system 10, and/or a temperature of the exhaust, the model may be referenced to determine an amount of NO and/or $NO_2$ leaving oxidation catalyst 36 and entering reduction catalyst 28. As a result, the signal directed from sensor 44 to controller 42 may be based on calculated and/or estimated values rather than direct measurements, if desired. It is contemplated that rather than a separate element, these virtual sensing functions may be accomplished by controller 42, if desired.

The operational parameter of reduction catalyst 28 may be monitored by way of a temperature sensor and/or a flow meter sensor 46. Sensor 46 may be located anywhere within exhaust system 22 to generate a signal indicative of an operating temperature of reduction catalyst 28 (more specifically, of catalyst substrate 28a) and/or of a flow rate of exhaust entering or passing through reduction catalyst 28. In one example, sensor 46 may be located upstream of catalyst substrate 28a. In another example, sensor 46 may be located in contact with or downstream of catalyst substrate 28a. The temperature and/or flow rate signals may be utilized by controller 42 to determine a reducing capacity of reduction catalyst 28. That is, based on known dimensions and age of reduction catalyst 28, and based on the measured operational parameters, a performance of reduction catalyst 28 may be predicted. It is contemplated that flow meter sensor 46 may alternatively embody a virtual sensor, similar to sensor 44, if desired.

Figure 2:
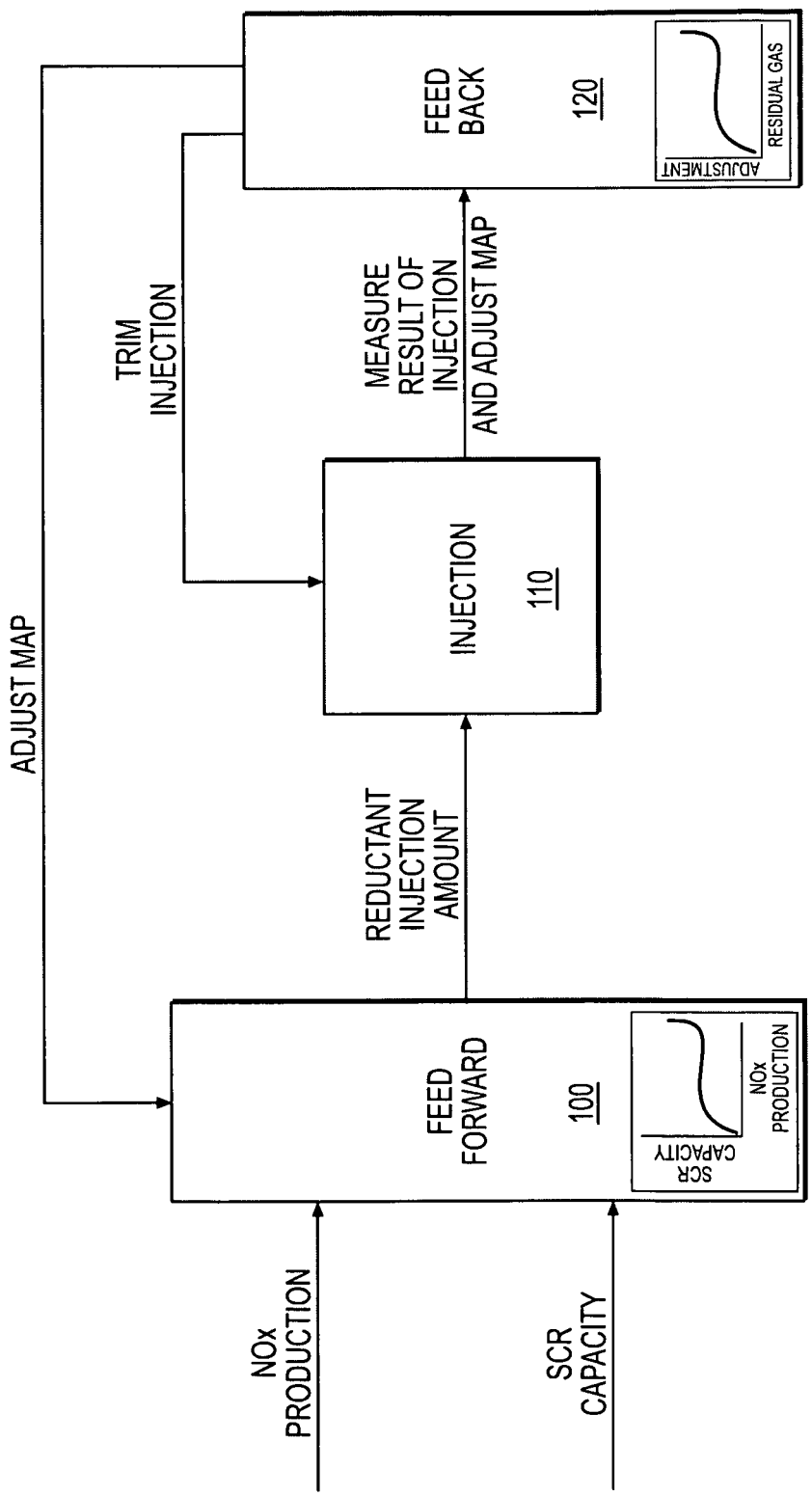
FIG. 2 is a control chart depicting an exemplary operation that may be performed by the power system of FIG. 1.

As illustrated in the control chart of FIG. 2, the $NO_X$ production signal and the SCR performance/capacity signal from sensors 44,46 may be utilized by controller 42 to determine an amount of reductant that should be injected to reduce the produced $NO_X$ to an acceptable level. That is, based on current engine operation (i.e., $NO_X$ production) and the predicted performance or reduction capacity of catalyst 28, controller 42 may reference a $NO_X$/reductant relationship map stored in memory thereof to determine an initial quantity of reductant that should be injected into passageway 24. This process of determining the initial injection amount may be known as feedforward control and is illustrated in FIG. 2 as control block 100.

Controller 42 may then adjust the injection amount determined in control block 100 based on actual performance parameters measured downstream of reduction catalyst 28. That is, after an initial reductant injection (illustrated as control block 110 in FIG. 2) of the quantity determined above in control block 100, controller 42 may sense the actual performance of reduction catalyst 28 and adjust future reductant injections accordingly. For this purpose, control system 40 may include a constituent sensor 50 located downstream of catalyst substrate 28a. In one example, controller 42 may reference a signal from sensor 50 with a residual gas/reductant relationship map stored in memory thereof to determine the adjustment amount. This process of adjusting the injection amount based on a measured performance parameter may be known as feedback control and is illustrated as control block 120 in FIG. 2.

Similar to sensor 44, sensor 50 may also generate a signal indicative of the presence of a particular constituent within the exhaust flow. For instance, sensor 50 may be a $NO_X$ sensor configured to determine a residual amount (i.e., quantity, relative percent, ratio, etc.) of NO and/or $NO_2$ present within the exhaust flow downstream of reduction catalyst 28. In an alternative embodiment, sensor 50 may be configured to determine a residual amount of $NH_3$. It is contemplated that sensor 50 may sense both $NO_X$ and $NH_3$, if desired, or that two separate sensors may be included for this purpose. Sensor 50 may generate a signal indicative of these measurements and send it to controller 42.

For the purposes of this disclosure, a map (i.e., the $NO_X$/reductant relationship map or the residual gas/reductant relationship map) may include any collection of data in the form of tables, graphs, and/or equations (e.g., regression equations, neural network models, decision or binary tree models, physics equations that describe a system, etc.) that represents an intended relationship. As mentioned above, with regard to the $NO_X$/reductant relationship map, controller 42 may reference the $NO_X$ production of power system 10 (or an amount of $NO_X$ measured or calculated at any location within passageway 24 upstream of or within reduction catalyst 28) and a performance parameter of reduction catalyst 28 (e.g., a capacity of reduction catalyst 28 to reduce the $NO_X$ present, as determined based on a temperature, flow rate, age, size, and/or another parameter of catalyst substrate 28a) with this map to determine an initial amount of reductant that should be injected into passageway 24 to reduce the $NO_X$ present to acceptable levels.

Controller 42 may adjust a stored calibration of power system 10 and exhaust system 22 by populating the $NO_X$/reductant relationship map during operation. Specifically, each engine, oxidation catalyst, reduction catalyst, sensor, injector, etc., may perform differently due to manufacturing variability. If unaccounted for, this variability could result in excessive exhaust emissions and/or poor performance of power system 10. To account for this variability, each power system 10 (engine and exhaust system pairing) may be uniquely calibrated. Controller 42 may adjust the $NO_X$/reductant relationship by monitoring an effectiveness of exhaust system 22, specifically reductant injector 28b, under varying engine and ambient operating conditions. It is contemplated that this calibration adjusting may be performed only at initial commissioning of power system 10, at each startup, periodically during operation thereof, after major repair or replacement, or at any other suitable time.

Controller 42 may also populate the residual gas/reductant relationship map. That is, after the $NO_X$/reductant relationship map has been populated, some adjustment to the initial amount of reductant determined via that map may still be necessary. The necessity of adjustment may be determined through the use of sensor 50. Specifically, if, after a first reductant injection event has occurred (in an amount determined by reference to the $NO_X$/reductant relationship map), the feedback provided by way of sensor 50 may indicate a need for more or less reductant in a subsequent injection event occurring under similar operating conditions (i.e., if an amount of residual $NO_X$ measured by sensor 50 is too high, additional reductant may be injected during the subsequent injection event; similarly, if too low, less reductant may be injected). To ensure responsiveness of exhaust system 22, rather than waiting for the signal from sensor 50 after each injection event, the feedback adjustment amount may be taken directly from the residual gas/reductant relationship map. In this situation, the signals from sensor 50 may be used to update the map at any time. It is contemplated that instead of or in addition to relying on feedback information from sensor 50, a physics-based model may be used to estimate an amount of ammonia stored at various depths within catalyst substrate 28a, if desired.

To help ensure stability of exhaust system 22, the signals from sensor 50 and/or the associated adjustment amounts may be processed (i.e., time averaged, filtered, domain transformed, etc.) prior to inclusion within the residual gas/reductant relationship map. In particular, rather than updating the map after every injection event (or every time a sample is taken by sensor 50), the signals from sensor 50 and/or the associated adjustment amounts may be averaged over a particular time period, and then only the averaged adjustment amount uploaded to the map. In one example, the map may only be updated during steady-state or startup conditions.

As mentioned above, the different components of power system 10 and exhaust system 22 may age and function differently with age. If otherwise unaccounted for, this aging may cause the adjustment amounts stored within the residual gas/reductant relationship map to continually grow. Eventually, the minor adjustments provided by reference to the residual gas/reductant relationship map may no longer be minor. For this purpose, sensors 44 and 50 may be utilized to determine an age of power system 10 and exhaust system 22, respectively. And, to help ensure accuracy and responsiveness of an aging system, the residual gas/reductant relationship map may be periodically used to update the $NO_X$/reductant relationship map based on signals from sensors 44 and 50. That is, after a particular period of time has elapsed or, alternatively, when the adjustment amounts stored within the residual gas/reductant relationship map exceed a threshold amount, the adjustment values from the $NO_X$/reductant relationship map may be used to update the initial injection amounts stored within the $NO_X$/reductant relationship map (i.e., the adjustment values may be periodically added to the initial injection amounts and stored as new initial injection amounts within the $NO_X$/reductant relationship map). In one example, the time between $NO_X$/reductant relationship map updates may be greater than the time between residual gas/reductant relationship map updates.

It is contemplated that additional sensors (not shown) may be utilized to determine aging of particular components within exhaust system 22. For example, sensors located between and/or downstream of oxidation catalyst 36, reduction catalyst 38, and an optional ammonia oxidation catalyst (not shown) positioned downstream of reduction catalyst 38 may provide indications of aging of each of these components. Based on signals from each of these sensors, problems with each of the components of exhaust system 22 may be diagnosed.

Controller 42 may also be configured to diagnose problems associated with power system 10 and, more specifically, with exhaust system 22. That is, controller 42 may be configured to use the reductant adjustment amounts from the residual gas/reductant relationship map and/or signals from sensor 50 to determine a malfunction of power system 10 and/or exhaust system 22, and to generate an error flag in response thereto.

For example, if any one adjustment value within the residual gas/reductant relationship map and/or an amount of residual gas monitored by sensor 50 (single amount or time averaged amount) exceeds a threshold value, a malfunction of power system 10 and/or exhaust system 22 may be determined. That is, if an excessive amount of residual gas is detected downstream of reduction catalyst 28 or if an excessive adjustment in the injection amount of reductant is necessary to sufficiently reduce the $NO_X$ present, it can be concluded that either power system 10 is producing an excessive amount of $NO_X$, oxidation catalyst 36 is not converting a sufficient amount of NO to $NO_2$, reduction catalyst 28 is not reducing a sufficient amount of $NO_X$, the reductant has an improper formulation, the reductant dosing system has malfunctioned, or the sensors associated therewith are providing erroneous signals. In this manner, the reductant relationship/adjustment maps, as well as additional sensors, may be used to locate root cause narrow down the possible errors in power system 10.

In another example, if the amount of residual gas detected following one injection event is significantly different from the amount of residual gas detected following another similar injection event (e.g., greater than a threshold amount), a power system malfunction may be determined. That is, if, between injection events, the amount of $NO_X$ downstream of reduction catalyst 28 suddenly changes (or the measurement thereof suddenly changes by a threshold amount), regardless of the absolute magnitudes of the amounts, the relative change can be indicative of a power system failure.

In one embodiment, controller 42 may be able to classify an error flag as being associated with engine operation of power system 10 or with operation of exhaust system 22. In this embodiment, controller 42 may compare the signals received from sensors 44 and 50. If both sensors 44 and 50 indicate a rise in the amount of detected $NO_X$ and an error has been flagged, controller 42 may conclude that power system 10 is unexpectedly producing an excessive amount of $NO_X$. However, if the signal from sensor 44 indicates an expected level of $NO_X$ production, yet the signal from sensor 44 indicates excessive residual gas and/or the associated adjustment amount taken from the residual gas/reductant relationship map is excessive, the error flag may be determined by controller 42 to be most likely due to an exhaust system failure.

INDUSTRIAL APPLICABILITY

The exhaust system of the present disclosure may be applicable to any power system having a reduction catalyst, where precise control of reductant injections is important. Injection control may be improved by providing both feedforward and feedback control. Operation of power system 10 will now be described.

Referring to FIG. 1, air induction system 16 may pressurize and force air or a mixture of air and fuel into cylinders 14 of power system 10 for subsequent combustion. The fuel and air mixture may be combusted by power system 10 to produce a mechanical work output and an exhaust flow of hot gases. The exhaust flow may contain a complex mixture of air pollutants composed of gaseous material, which can include oxides of nitrogen ($NO_X$). As this $NO_X$ laden exhaust flow is directed from cylinders 14 through oxidation catalyst 36, NO may be converted to $NO_2$.

Following oxidation catalyst 36, the exhaust flow may be directed toward reduction catalyst 28, where the $NO_X$ may be reduced to water and elemental nitrogen. Prior to reaching reduction catalyst 28, controller 42 may, based on input from sensors 44 and 50 and with reference to the $NO_X$/reductant relationship map, determine an initial injection amount of reductant required for oxidation catalyst 36 to sufficiently reduce the $NO_X$ produced by power system 10. Then, based on performance parameters of oxidation catalyst 36 previously measured by sensor 50 and with reference to the residual gas/reductant relationship map, the initial injection amount of reductant may be adjusted for the current injection event.

Several advantages may be associated with power system 10. For example, because controller 42 may account for manufacturing variability and aging, the accuracy of different power systems may be high throughout their useful life. And, because power system 10 may be calibrated in situ, the cost of calibration testing on each system may be minimal. In addition, because controller 42 may diagnose and classify malfunctions, the operational costs of power system 10 may be low.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. An exhaust system for a combustion engine, comprising:
    an exhaust passageway;
    a reduction catalyst disposed within the exhaust passageway;
    a reductant injector located to direct reductant into the exhaust passageway upstream of the reduction catalyst; and
    a controller in communication with the reductant injector and having a $NO_X$/reductant relationship map stored in memory thereof, the controller being configured to:
        receive a first input relating to an amount of $NO_X$ within the exhaust passageway upstream of the reduction catalyst;
        reference the $NO_X$/reductant relationship map to determine an initial amount of reductant that should be directed into the exhaust passageway based on the first input;
        receive a second input relating to performance of the reduction catalyst;
        determine an adjustment to the initial amount of reductant based on the second input;
        regulate operation of the reductant injector to direct an adjusted amount of reductant into the exhaust passageway; and
        update the $NO_X$/reductant relationship map based on the determined adjustment, wherein the controller is configured to periodically update the $NO_X$/reductant relationship map with time averaged values for the determined adjustment.

2. The exhaust system of claim 1, wherein the $NO_X$/reductant relationship map is populated in situ.

3. The exhaust system of claim 1, further including:
    a first constituent sensor located upstream of the reduction catalyst; and
    a second constituent sensor located downstream of the reduction catalyst,
    wherein the controller is further configured to classify an error flag as being related to one of the combustion engine and the exhaust system based on input from the first and second constituent sensors.

4. The exhaust system of claim 1, further including a constituent sensor located downstream of the reductant catalyst, wherein the performance of the reduction catalyst is related to a measurement of residual gas by the constituent sensor.

5. The exhaust system of claim 4, wherein the residual gas is $NO_X$.

6. The exhaust system of claim 4, wherein the residual gas is $NH_3$.

7. The exhaust system of claim 4, wherein:
    the controller further includes a residual gas/reductant relationship map stored in memory thereof; and
    the controller is further configured to reference the residual gas/reductant relationship map to determine the adjustment based on the measurement by the constituent sensor.

8. The exhaust system of claim 7, wherein the residual gas/reductant relationship map is periodically updated with time averaged values.

9. The exhaust system of claim 8, wherein:
    the $NO_X$/reductant relationship map is periodically updated with time averaged values from the residual gas/reductant relationship map; and
    the $NO_X$/reductant relationship map is updated less frequently than the residual gas/reductant relationship map.

10. The exhaust system of claim 1, wherein the controller is further configured to:
    compare the determined adjustment to a threshold value; and
    generate an error flag when the determined adjustment is greater than the threshold value.

11. The exhaust system of claim 10, wherein the controller is further configured to:
    compare an adjusted amount associated with a first reductant injection event to an adjusted amount associated with a second reductant injection event; and
    generate an error flag when the adjusted amount associated with the first reductant injection event is substantially different than the adjusted amount associated with the second reductant injection event.

12. A method of operating a combustion engine, comprising:
    directing a flow of exhaust from the combustion engine through a reduction catalyst;
    determining an amount of $NO_X$ in the flow of exhaust upstream of the reduction catalyst;
    referencing a $NO_X$/reductant relationship map to determine an initial amount of reductant that should be directed into the flow of exhaust based on the determined amount of $NO_X$;
    determining a performance of the reduction catalyst;
    determining an adjusted amount of reductant based on the determined performance;
    directing the adjusted amount of reductant into the exhaust flow upstream of the reduction catalyst; and
    updating the $NO_X$/reductant relationship map based on a difference between the initial amount of reductant and the adjusted amount of reductant, wherein updating includes periodically updating the $NO_X$/reductant relationship map with time averaged values for the difference between the initial amount of reductant and the adjusted amount of reductant.

13. The method of claim 12, further including:
sensing a constituent at a location upstream of the reduction catalyst;
sensing a constituent at a location downstream of the reduction catalyst; and
classifying an error flag as being related to one of the combustion engine and the reduction catalyst based on the constituents sensed upstream and downstream of the reduction catalyst.

14. The method of claim 12, wherein:
determining a performance of the reduction catalyst includes sensing a residual gas downstream of the reduction catalyst; and
determining the adjusted amount of reductant includes referencing the sensed residual gas with a residual gas/reductant relationship map.

15. The method of claim 14, further including periodically updating the residual gas/reductant relationship map, wherein:
the $NO_X$/reductant relationship map is periodically updated with time averaged values from the residual gas/reductant relationship map; and
the $NO_X$/reductant relationship map is updated less frequently than the residual gas/reductant relationship map.

16. The method of claim 12, further including:
comparing the adjusted amount of reductant to a threshold value; and
generating an error flag when the adjusted amount of reductant is greater than the threshold value.

17. The method of claim 16, further including:
comparing an adjusted amount associated with a first reductant injection event to an adjusted amount associated with a second reductant injection event; and
generating an error flag when the adjusted amount associated with the first reductant injection event is substantially different than the adjusted amount associated with the second reductant injection event.

18. A power system, comprising:
an engine configured to combust fuel and generate a flow of exhaust;
an exhaust passageway leading from the engine to the atmosphere;
an SCR catalyst disposed within the exhaust passageway;
a first sensor located to generate a first signal indicative of a $NO_X$ production by the engine;
a second sensor located downstream of the SCR catalyst to generate a second signal indicative of a residual amount of at least one of $NO_X$ and $NH_3$;
an injection device located to inject urea into the exhaust passageway upstream of the SCR catalyst; and
a controller in communication with the engine, the first sensor, the second sensor, and the injection device, the controller being configured to:
reference a $NO_X$/urea relationship map to determine an initial amount of urea that should be directed into the exhaust passageway based on the first signal;
reference a residual gas/urea relationship map to determine an adjustment to the initial amount of urea based on the second signal;
regulate operation of the urea injector to direct an adjusted amount of urea into the exhaust passageway;
periodically update the $NO_X$/urea relationship map with time averaged values from the residual gas/urea relationship map; and
periodically update the residual gas/urea relationship map with time averaged values from the second sensor.

* * * * *